United States Patent
Abbatiello et al.

(10) Patent No.: US 11,230,090 B2
(45) Date of Patent: Jan. 25, 2022

(54) THERMOPLASTIC CARBON FIBER LAMINATE WITH A RANDOMLY ORIENTED FIBER CORE LAYER

(71) Applicant: Dell Products L.P., Round Rock, TX (US)

(72) Inventors: Nicholas Donald Abbatiello, Round Rock, TX (US); David Wheeler Williams, Salado, TX (US)

(73) Assignee: Dell Products L.P., Round Rock, TX (US)

( * ) Notice: Subject to any disclaimer, the term of this patent is extended or adjusted under 35 U.S.C. 154(b) by 182 days.

(21) Appl. No.: 16/527,311

(22) Filed: Jul. 31, 2019

(65) Prior Publication Data
US 2021/0031502 A1    Feb. 4, 2021

(51) Int. Cl.
| | |
|---|---|
| *B32B 37/06* | (2006.01) |
| *B32B 5/26* | (2006.01) |
| *B32B 5/02* | (2006.01) |
| *B29C 65/70* | (2006.01) |
| *B29C 70/46* | (2006.01) |
| *B29K 101/12* | (2006.01) |
| *B29K 105/12* | (2006.01) |
| *B29K 269/00* | (2006.01) |
| *B29K 307/04* | (2006.01) |

(52) U.S. Cl.
CPC .............. *B32B 37/06* (2013.01); *B29C 65/70* (2013.01); *B29C 70/465* (2013.01); *B32B 5/022* (2013.01); *B32B 5/26* (2013.01); *B29K 2101/12* (2013.01); *B29K 2105/12* (2013.01); *B29K 2269/00* (2013.01); *B29K 2307/04* (2013.01); *B32B 2262/0276* (2013.01); *B32B 2262/106* (2013.01)

(58) Field of Classification Search
None
See application file for complete search history.

(56) References Cited

U.S. PATENT DOCUMENTS

| | | | | |
|---|---|---|---|---|
| 5,993,934 | A | * | 11/1999 | Reese ........................ B32B 5/26 264/115 |
| 2013/0309001 | A1 | | 11/2013 | Teshima et al. |
| 2014/0194645 | A1 | * | 7/2014 | Anderson ........... B29B 17/0206 560/129 |
| 2014/0248816 | A1 | * | 9/2014 | Bonavoglia .......... D04H 1/4291 442/361 |
| 2016/0159046 | A1 | | 6/2016 | Abbatiello et al. |
| 2018/0099479 | A1 | | 4/2018 | Abbatiello et al. |
| 2018/0319539 | A1 | * | 11/2018 | Haruta .................... B32B 27/20 |
| 2020/0299472 | A1 | * | 9/2020 | Deitmerg ................ B29C 70/40 |

* cited by examiner

*Primary Examiner* — Mark A Osele
*Assistant Examiner* — Evan T Hulting
(74) *Attorney, Agent, or Firm* — Baker Botts L.L.P.

(57) ABSTRACT

In one or more embodiments, one or more systems, methods, and/or processes may place a first outer layer, a core layer, and a second outer layer in a mold; and may heat the mold to at least thirty degrees Celsius above a glass transition temperature (Tg) for a period of time. In one or more embodiments, the polycarbonate fibers may be between eight and ten deniers per filament. In one or more embodiments, the Tg may be no more than 105 degrees Celsius. In one or more embodiments, the one or more systems, methods, and/or processes may further allow the first outer layer, the core layer, and the second outer layer to cool below the Tg, after the period of time. For example, after the layers cool, a shear modulus of the core layer may be in a range of 0.9868 megapounds per square inch (msi) to 2.2730 msi.

14 Claims, 14 Drawing Sheets

THERMOPLASTIC CARBON FIBER LAMINATE WITH A RANDOMLY ORIENTED FIBER CORE LAYER

BACKGROUND

Field of the Disclosure

This disclosure relates generally to information handling systems and, more particularly, to a thermoplastic carbon fiber laminate with a randomly oriented fiber reinforced core layer for information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Advancements in packaging design have reduced both the weight and thickness of information handling systems. In particular, components included in portable information handling systems, such as laptops, notebooks, and tablet form factors, are the object of efforts to reduce weight and thickness, without compromising structural strength.

As overall weight of portable information handling systems decreases, the weight contribution of mechanical components has come under increased scrutiny by product designers. Although reducing the thickness of a mechanical component will reduce weight, an undesirable reduction in structural rigidity may also occur with thinner mechanical components.

In particular, when the mechanical component comprises a carbon fiber laminate with multiple layers, different technologies are available to reduce weight, but may not meet design criteria for cost and structural rigidity (e.g., stiffness).

SUMMARY

In one or more embodiments, one or more systems, methods, and/or processes may place a first outer layer, a core layer, and a second outer layer in a mold; and may heat the mold to at least thirty degrees Celsius above a glass transition temperature (Tg) for a period of time. For example, the one or more systems, methods, and/or processes may manufacture a carbon fiber composite material. In one or more embodiments, the first outer layer may include a first thermoplastic matrix reinforced with first directional carbon fibers. In one or more embodiments, the core layer may include a nonwoven material that includes carbon fibers and polycarbonate fibers, wherein the carbon fibers are 30% to 40%, by weight, of the nonwoven material. In one or more embodiments, the second outer layer may include a second thermoplastic matrix reinforced with second directional carbon fibers. In one or more embodiments, the polycarbonate fibers may be between eight and ten deniers per filament. In one or more embodiments, the Tg is no more than 105 degrees Celsius. In one or more embodiments, a mechanical panel of the carbon fiber composite material may have a total thickness P. For example, the mechanical panel may have a stiffness corresponding to a deflection of the mechanical panel of less than 1% of a maximum span of the mechanical panel under a load of 100N force at a center of the mechanical panel. In one or more embodiments, the first outer layer may be a carbon fiber fabric. For example, the carbon fiber fabric may include a twill pattern. In one or more embodiments, the one or more systems, methods, and/or processes may further, after the period of time, allow the first outer layer, the core layer, and the second outer layer to cool below the Tg. In one or more embodiments, after allowing the first outer layer, the core layer, and the second outer layer to cool below the Tg, a shear modulus of the core layer may be in a range of 0.9868 megapounds per square inch (msi) to 2.2730 msi.

In one or more embodiments, a carbon fiber composite material may be produced and/or manufactured by a process that includes placing a first outer layer, a core layer, and a second outer layer in a mold; and heating the mold to at least thirty degrees Celsius above a Tg for a period of time. In one example, the first outer layer may include a first thermoplastic matrix reinforced with first directional carbon fibers. In a second example, the core layer may include a nonwoven material that may include carbon fibers and polycarbonate fibers, wherein the carbon fibers are 30% to 40%, by weight, of the nonwoven material. In another example, the second outer layer may include a second thermoplastic matrix reinforced with second directional carbon fibers. In one or more embodiments, the polycarbonate fibers may be between eight and ten deniers per filament. In one or more embodiments, the Tg may be no more than 105 degrees Celsius. In one or more embodiments, a mechanical panel of the carbon fiber composite material may have a total thickness P. For example, the mechanical panel may have a stiffness corresponding to a deflection of the mechanical panel of less than 1% of a maximum span of the mechanical panel under a load of 100N force at a center of the mechanical panel. In one or more embodiments, the first outer layer may be a carbon fiber fabric. For example, the carbon fiber fabric may include a twill pattern. In one or more embodiments, the process may further include, after the period of time, allowing the first outer layer, the core layer, and the second outer layer to cool below the Tg. For example, after allowing the first outer layer, the core layer, and the second outer layer to cool below the Tg, a shear modulus of the core layer is in a range of 0.9868 megapounds per square inch (msi) to 2.2730 msi. In one or more embodiments, an information handling system may control and/or implement at least a portion of the process.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
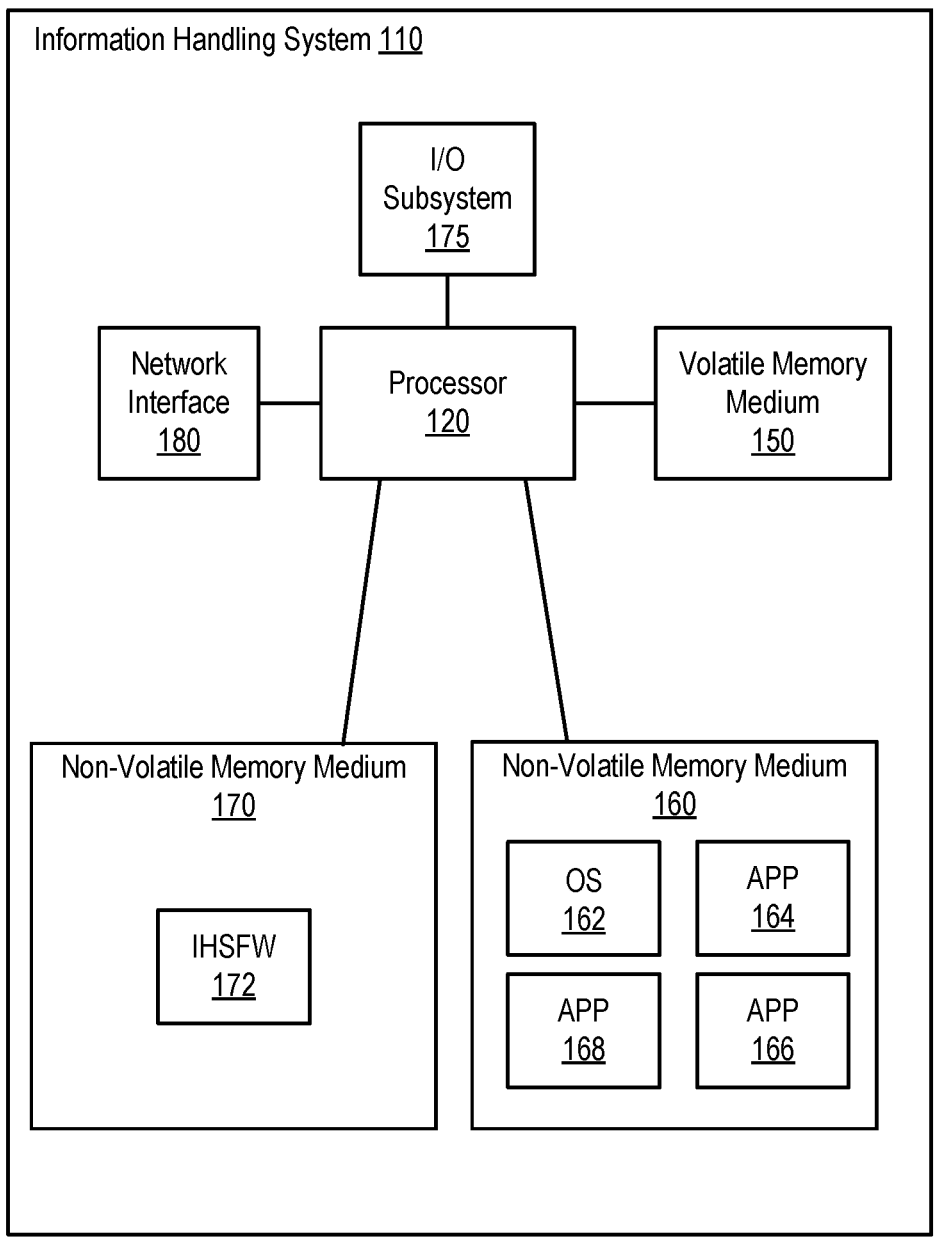
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a chassis of an information handling system may include woven thermoplastic carbon fabric and non-woven thermoplastic carbon fabric. For example, the woven thermoplastic carbon fabric and the non-woven thermoplastic carbon fabric may be thermally laminated together with heat and pressure. For instance, the woven thermoplastic carbon fabric and the non-woven thermoplastic carbon fabric may be combined with heat and pressure to form at least a portion of the chassis of the information handling system.

In one or more embodiments, a core layer of a chassis may be produced via a wet lay process. In one or more embodiments, a core layer of a chassis may be produced via a dry lay process. In one or more embodiments, a core layer of a chassis may include a polycarbonate. In one or more embodiments, the polycarbonate of the core layer of the chassis may include polycarbonate fibers. In one example, the polycarbonate fibers may be greater than or equal to eight denier. In a second example, the polycarbonate fibers may be less than or equal to ten denier. In another example, the polycarbonate fibers may be within a range of eight denier to ten denier.

In one or more embodiments, a polycarbonate may normally utilize a char producing material as a flame retardant. In one or more embodiments, a polycarbonate may be produced with an active flame retardant that starves oxygen rather than producing char. For example, the polycarbonate may be produced with an active flame retardant that includes a mechanism which starves oxygen rather than producing char. In one or more embodiments, the polycarbonate may pass a UL 94V0 test. For example, the polycarbonate may have a flameout time low enough to pass the UL 94V0 test. For instance, the polycarbonate may have a flameout time that may be less than a maximum flameout time of the UL 94V0 test.

In one or more embodiments, a polycarbonate fiber may be produced from a thermoplastic resin. For example, a thermoplastic resin may include one or more of a polycarbonate, a polyamide, a polyphenylene a polyoxymethylene, a polyphenylene, a sulfide, an ether, a modified polyphenylene ether, polybutylene terephthalate, a polyethylene naphthalate, a polyethylene terephthalate, a polyethylene, a polypropylene, a polymethylmethacrylate, a polystyrene, an ABS (Acrylonitrile Butadiene Styrene) resin, and a SA (Styrene Acrylonitrile) resin, among others In one or more embodiments, an information handling system may be a portable information handling system. For example, at least certain mechanical components, such as display cover panels, or other external panels, may be constructed using a thermoplastic carbon fiber laminate with a randomly oriented fiber reinforced core layer, as described in further detail herein. In one or more embodiments, a thermoplastic carbon fiber laminate may be referred to as a non-woven thermoplastic carbon fiber laminate which may include three layers: a first outer layer, a core layer, and a second outer layer. It is noted that in one or more embodiments, fewer layers or more layers may be included in a non-woven thermoplastic carbon fiber laminate.

In one or more embodiments, in a construction of thermoplastic laminates used for information handling systems, a low weight and, thus, a low material density may be desirable. It may often be a choice of a core layer that is used to reduce overall density, such as by using a resin core, a honeycomb core, etc. However, it has been observed that, even when very stiff fibers are used to reinforce the outer layers, such as carbon fiber weave, core layers constructed of resin or honeycomb may result in reduced overall flexural stiffness, which may be undesirable. Furthermore, the use of a so-called "directional carbon fiber", which refers to carbon fiber in the form of a weave or a unidirectional carbon fiber layer, may add cost to the overall laminate, which may also be undesirable.

In one or more embodiments, a nonwoven thermoplastic carbon fiber laminate may include a core layer that may include a nonwoven carbon fiber reinforced thermoplastic material. In one or more embodiments, a "nonwoven carbon fiber" may refer to randomly oriented discrete carbon fibers. In one or more embodiments, in a core layer, non-woven carbon fiber having fiber lengths of greater than about one inch may be used in one or more embodiments as fiber reinforcement having isotropic stiffening properties.

In one or more embodiments, a size or length of the carbon fibers may vary, such as between one-tenth of an inch and two inches, from about five-tenths of an inches to one and one half inches in length, or greater than about one half inch in length. In one or more embodiments, the non-woven carbon fiber used may be virgin (i.e., new) or recycled carbon fiber material. As a result of the random, anisotropic orientation of the carbon fibers, nonwoven thermoplastic carbon fiber laminate may achieve a very high stiffness at a relatively low cost, which may be desirable for construction of mechanical components for portable information handling systems.

In one or more embodiments, outer layers may include a directional carbon fiber reinforced thermoplastic material. For example, directional carbon fiber may be or include a weave or a unidirectional (e.g., parallel) fiber layer. For instance, the orientation of the directional carbon fiber may be different or the same between the outer layers.

In one or more embodiments, an overall thickness of the nonwoven thermoplastic carbon fiber laminate may be less than 2 mm thick, less than 1.6 mm thick, or less than 1.4 mm thick. For example, the core layer may be less than 1.4 mm thick, or about 1.0 mm thick. For instance, when an overall size of a panel created using the non-woven thermoplastic carbon fiber laminate may be 335 mm by 230 mm, corresponding to about a fourteen inch display screen cover, a load of 100N applied at the center of the panel may result in a deflection of less than about 3.6 mm when the overall thickness of the non-woven thermoplastic carbon fiber laminate is 1.4 mm, with the core layer being 1.0 mm thick. Thus, even when the outer layers include relatively expensive directional carbon fiber, because the core layer may include a substantial portion of the overall volume of the non-woven thermoplastic carbon fiber laminate, the cost reduction or cost savings from the use of non-woven carbon fiber in the core layer may result in a meaningful impact on overall cost. In one example, in comparison to using glass fiber reinforcement in the core layer, the use of nonwoven carbon fiber may result in an overall weight reduction greater than 20% while achieving a cost savings of about 30. In another example, in comparison to using glass fiber reinforcement in the core layer, the use of nonwoven carbon fiber may result in an overall weight reduction greater than 20% while achieving a comparable stiffness.

In one or more embodiments, a first outer layer, a core layer, and a second outer layer may be formed using thermoplastic matrix compositions including polycarbonate or polysulfonate. For example, the same thermoplastic matrix may be used in the first outer layer, the core layer, and the second outer layer. In one or more embodiments, different thermoplastic matrix compositions may be used in one or more individual layers of the nonwoven thermoplastic carbon fiber laminate. It is noted that the layers in the nonwoven thermoplastic carbon fiber laminate may be thermally bonded together without the use of an adhesive or bonding agent, by raising the temperature until the thermoplastic matrix in each layer softens or melts, and then pressing the layers together such that the thermoplastic matrix forms a continuous or pseudo-continuous phase in the overall laminate, which is desirable for optimal strength and stiffness.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150, 160, and 170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 2A:
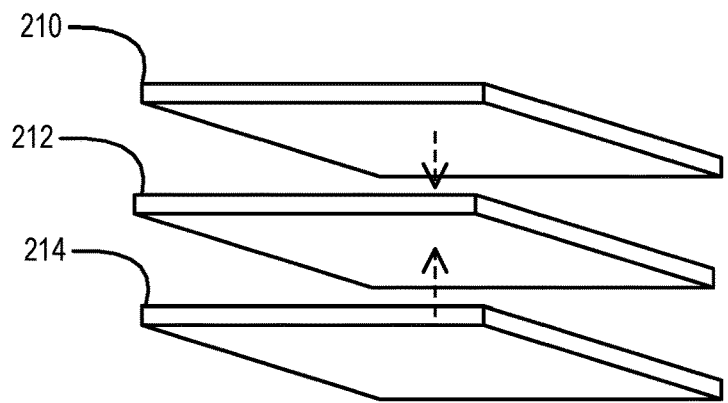
FIGS. 2A and 2B illustrate an example of manufacturing a carbon fiber composite material, according to one or more embodiments.
Figure 2B:
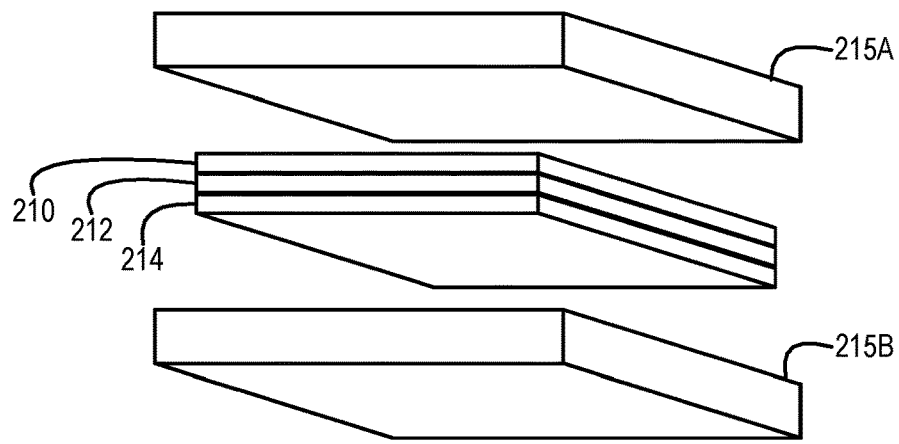

Turning now to FIGS. 2A and 2B, an example of manufacturing a carbon fiber composite material is illustrated, according to one or more embodiments. As shown in FIG. 2A, a first outer layer 210 may be brought into contact with a core layer 212. For example, first outer layer 210 may be placed on core layer 212. As illustrated, a second outer layer 214 may be brought into contact with core layer 214. For example, second outer layer 214 may be placed on core layer 214. In one or more embodiments, first outer layer 210, core layer 212, and second outer layer 214 may be placed in a mold. For example, the mold may include castings 215A and 215B. For instance, first outer layer 210, core layer 212, and second outer layer 214 may be compressed between castings 215A and 215B. In one or more embodiments, castings 215A and 215B may be heated. For example, castings 215A and 215B may be heated to one or more temperatures. For instance, castings 215A and 215B may be heated to one or more temperatures for one or more periods of time. In one or more embodiments, castings 215A and 215B may apply heat and pressure to first outer layer 210, core layer 212, and second outer layer 214.

Figure 2C:
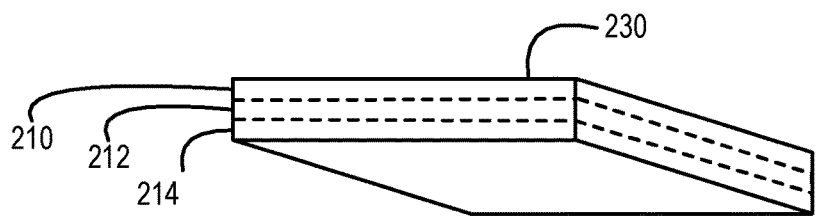
FIG. 2C illustrates an example of a carbon fiber composite material, according to one or more embodiments.

As shown in FIG. 2C, a carbon fiber composite material 230 may be manufactured and/or produced from first outer layer 210, core layer 212, and second outer layer 214. For example, a thickness of carbon fiber composite material 230 may be two millimeters (2 mm) or less. In one or more embodiments, a mechanical panel of carbon fiber composite material 230 may have a total thickness P. For example, the total thickness P may be two millimeters (2 mm) or less. In one or more embodiments, the mechanical panel may have a stiffness corresponding to a deflection of the mechanical panel of less than one percent (1%) of a maximum span of the mechanical panel under a load of 100N force at a center of the mechanical panel.

Figure 2D:
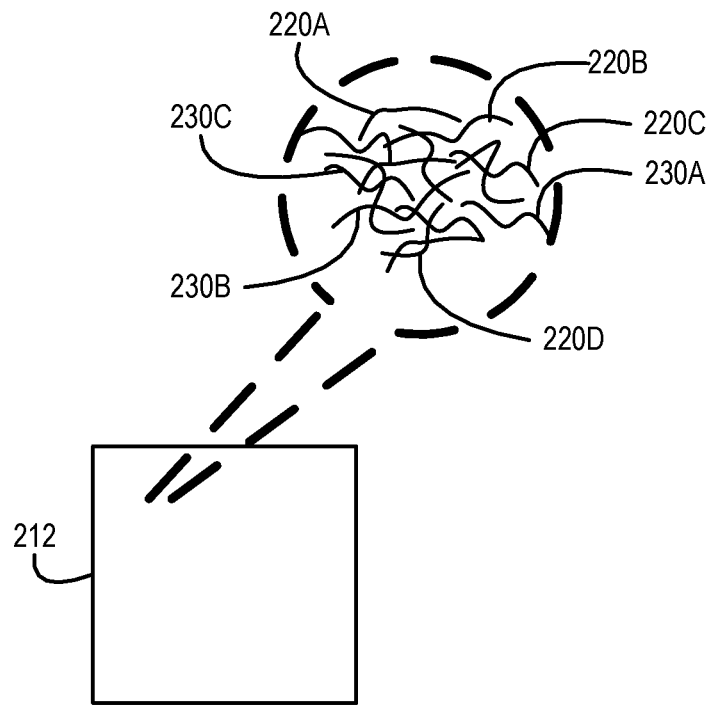
FIG. 2D illustrates an example of a core layer with polycarbonate fibers, according to one or more embodiments.

In one or more embodiments, first outer layer 210 may include carbon fibers. In one or more embodiments, second outer layer 214 may include carbon fibers. In one or more embodiments, core layer 212 may include carbon fibers. In one or more embodiments, core layer 212 may be or include a nonwoven material that includes carbon fibers 220A-220D and polycarbonate fibers 230A-230C, as shown in FIG. 2D. In one or more embodiments, carbon fibers 220 may be randomly arranged and/or oriented in the nonwoven material. In one example, the nonwoven material may include carbon fibers 220 of 30% or more by weight of the nonwoven material. In a second example, the nonwoven material may include carbon fibers 220 of 40% or less by weight of the nonwoven material. In another example, the nonwoven material may include carbon fibers 220 in a range of 30% to 40% by weight of the nonwoven material. For instance, for a weight measurement of the nonwoven material, a weight measurement of the carbon fibers 220 may be in a range of 30% to 40% of the weight measurement of the nonwoven material. In one or more embodiments, polycarbonate fibers 230 may be between eight and ten deniers per filament (dpf).

Figure 2E:
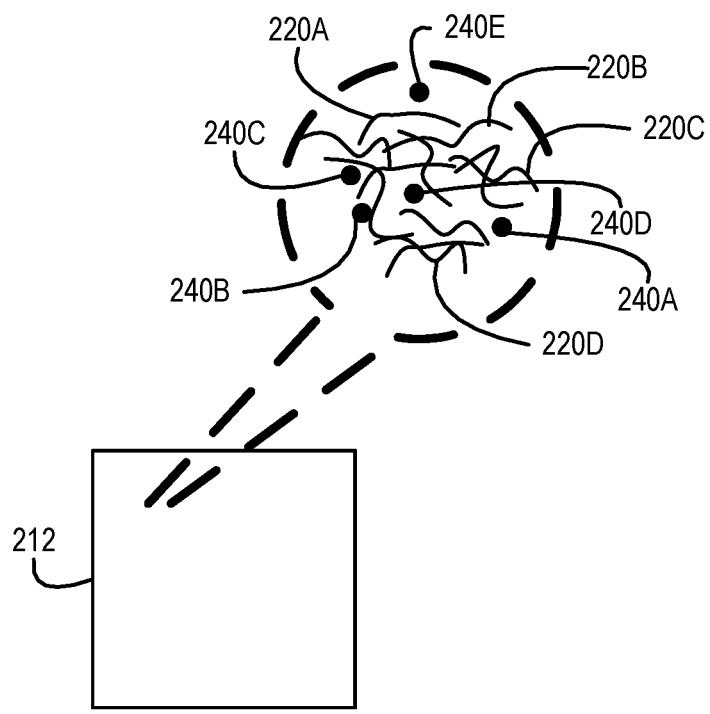
FIG. 2E illustrates an example of a core layer with polycarbonate particles, according to one or more embodiments.

In one or more embodiments, core layer 212 may be or include a nonwoven material that includes carbon fibers 220A-220D and polycarbonate particles 240A-240E, as shown in FIG. 2E. For example, polycarbonate particles 240A-240E may be or include polycarbonate powder particles. In one or more embodiments, carbon fibers 220 may be randomly arranged in the nonwoven material. In one example, the nonwoven material may include carbon fibers 220 of 30% or more by weight of the nonwoven material. In a second example, the nonwoven material may include carbon fibers 220 of 40% or less by weight of the nonwoven material. In another example, the nonwoven material may include carbon fibers 220 in a range of 30% to 40% by weight of the nonwoven material. For instance, for a weight measurement of the nonwoven material, a weight measurement of the carbon fibers 220 may be in a range of 30% to 40% of the weight measurement of the nonwoven material.

In one or more embodiments, the nonwoven material may be associated with a glass transition temperature (Tg) of or about one hundred and five degrees Celsius (105° C.). In one example, polycarbonate fibers 230 may have or may be associated with a Tg of or about 105° C. In another example, polycarbonate particles 240 may have or may be associated with a Tg of or about 105° C. In one or more embodiments, about 105° C. may be or include a range of temperatures of 105° C.±1° C. In one or more embodiments, about 105° C. may be or include a range of temperatures of 105° C.±2° C. In one or more embodiments, the nonwoven material may be associated with a Tg less than 105° C. In one or more embodiments, the nonwoven material may be associated with a Tg less than 110° C.

In one or more embodiments, one or more of outer layers 210 and 214 may include carbon fibers. As illustrated in FIGS. 2F-2Q, an outer layer 250 may include carbon fibers 220E-220H. In one example, first outer layer 210 may be or include an outer layer 250. In another example, second outer layer 214 may be or include an outer layer 250. In one or more embodiments, an outer layer 250 may represent one or more of outer layers 210 and 214.

Figure 2F:
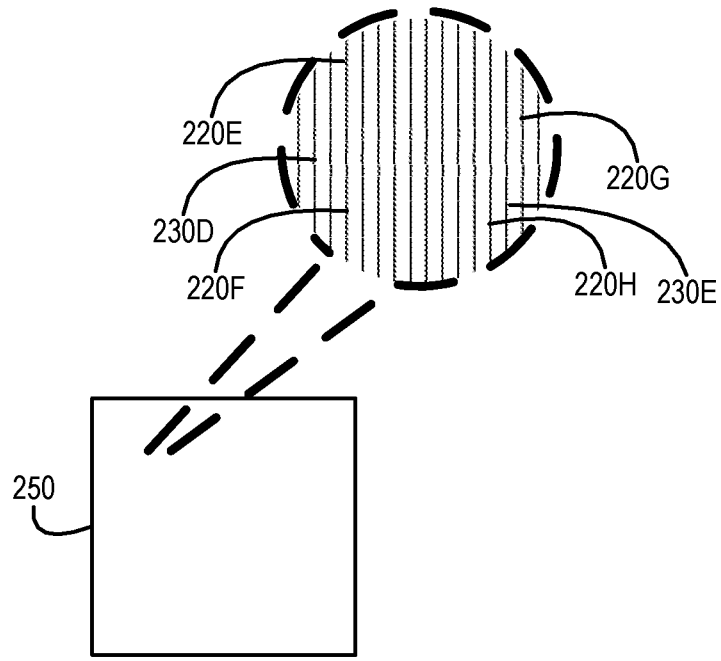
FIGS. 2F and 2G illustrate examples of an outer layer with polycarbonate fibers, according to one or more embodiments.
Figure 2G:
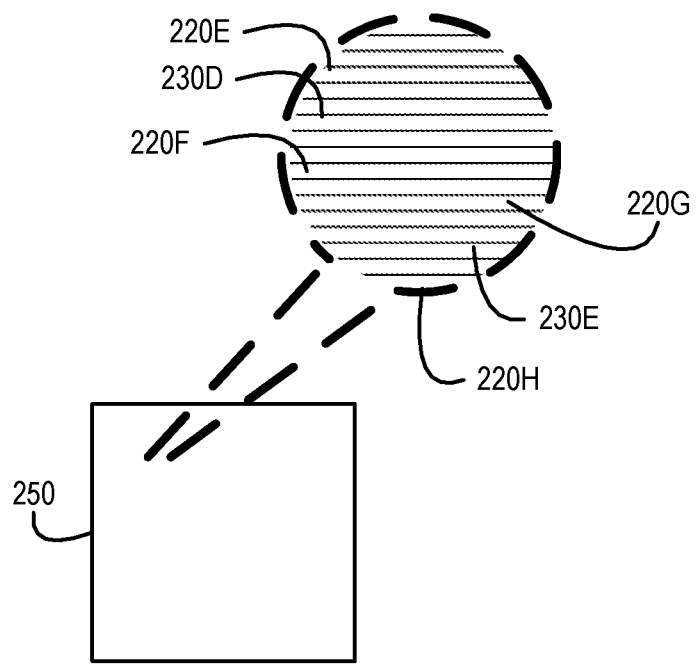
Figure 2H:
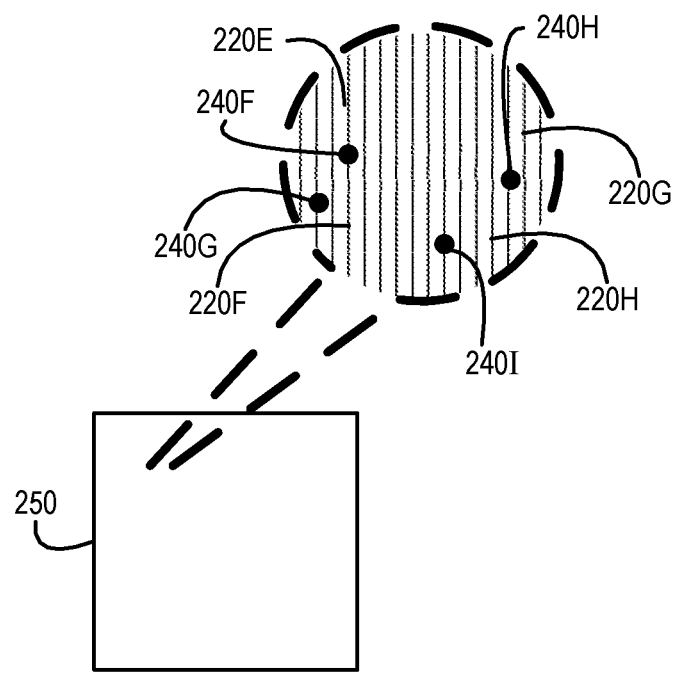
FIGS. 2H and 2I illustrate examples of an outer layer with polycarbonate particles, according to one or more embodiments.
Figure 2I:
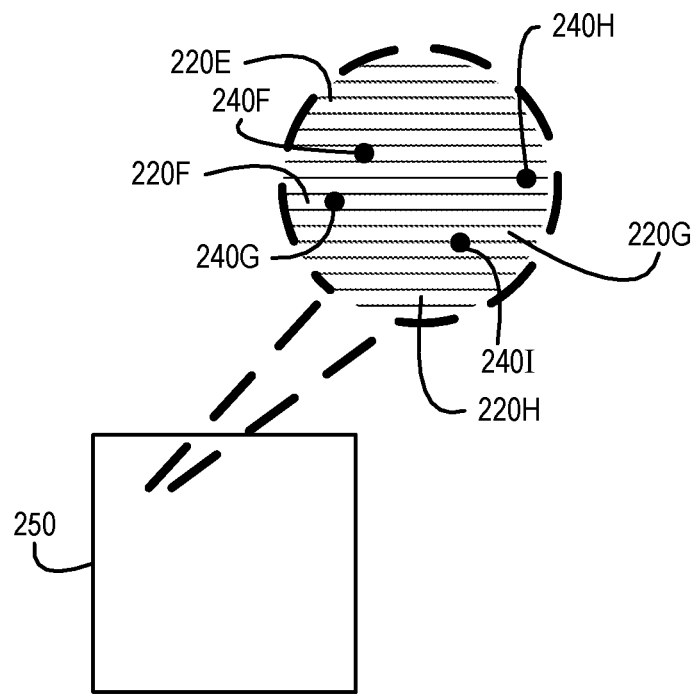
Figure 2J:
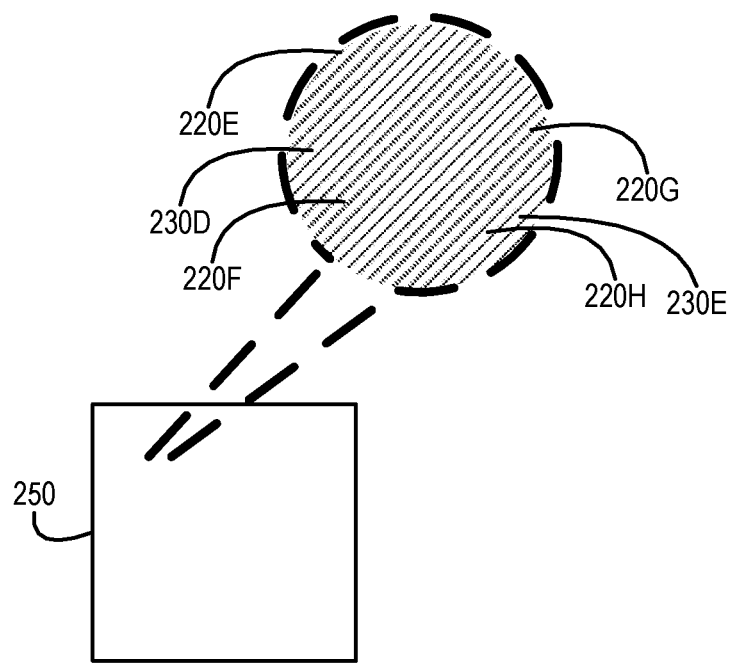
FIGS. 2J and 2K illustrate examples of an outer layer with polycarbonate fibers, according to one or more embodiments.

As shown in FIGS. 2F, 2G, and 2J, outer layer 250 may include polycarbonate fibers 230D and 230E. In one or more embodiments, a casting 215 may heat polycarbonate fibers 230. For example, a casting 215 may heat polycarbonate fibers 230 above a Tg of polycarbonate fibers 230. For instance, polycarbonate from polycarbonate fibers 230 may impregnate carbon fibers 220. In one or more embodiments, outer layer 250 may be or include a unidirectional material. For example, carbon fibers 220 and/or polycarbonate fibers 230 may be arranged in a unidirectional fashion, as illustrated in FIGS. 2F, 2G, and 2J.

Figure 2K:
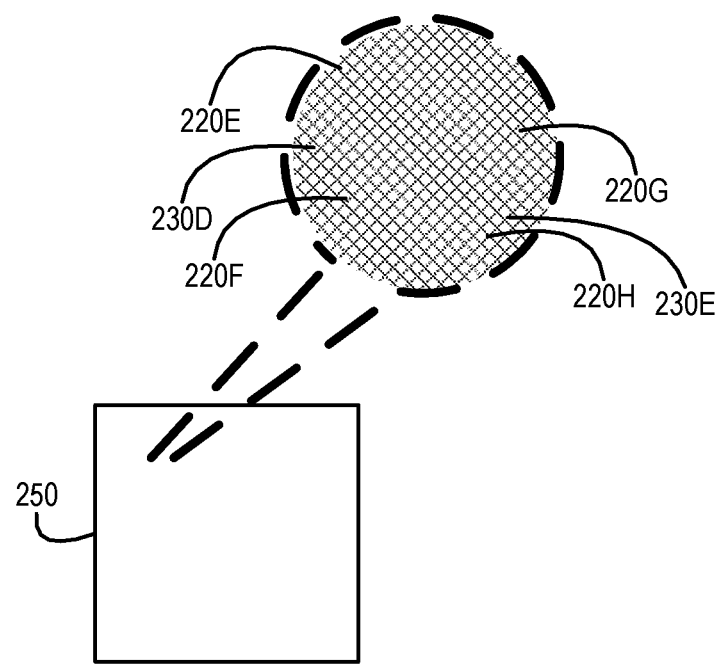
Figure 2L:
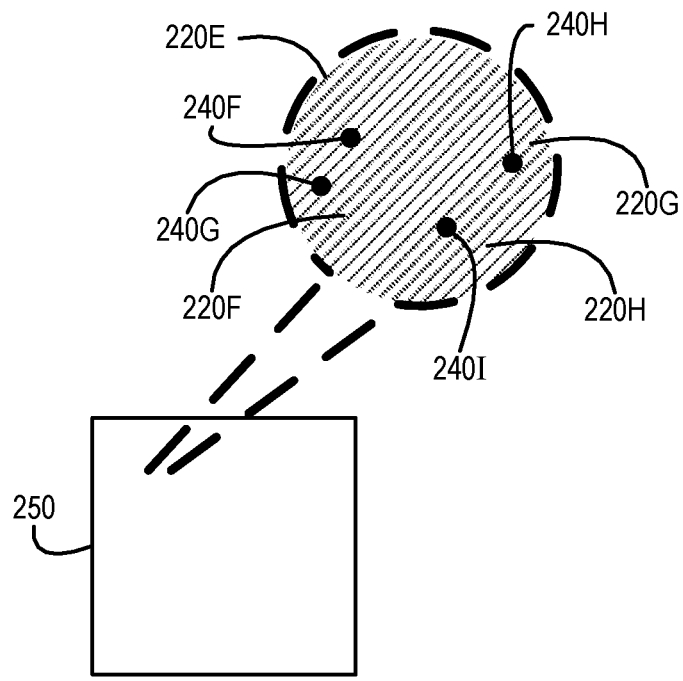
FIGS. 2L and 2M illustrate examples of an outer layer with polycarbonate particles, according to one or more embodiments.

As illustrated in FIGS. 2H, 2I, and 2L, outer layer 250 may include polycarbonate powder particles 240E-240I. In one or more embodiments, a casting 215 may heat polycarbonate powder particles 240. For example, a casting 215 may heat polycarbonate powder particles 240 above a Tg of polycarbonate powder particles 240. For instance, polycarbonate from polycarbonate powder particles 240 may impregnate carbon fibers 220. In one or more embodiments, outer layer 250 may be or include a unidirectional material. For example, carbon fibers 220 may be arranged in a unidirectional fashion, as illustrated in FIGS. 2H, 2I, and 2L.

Figure 2M:
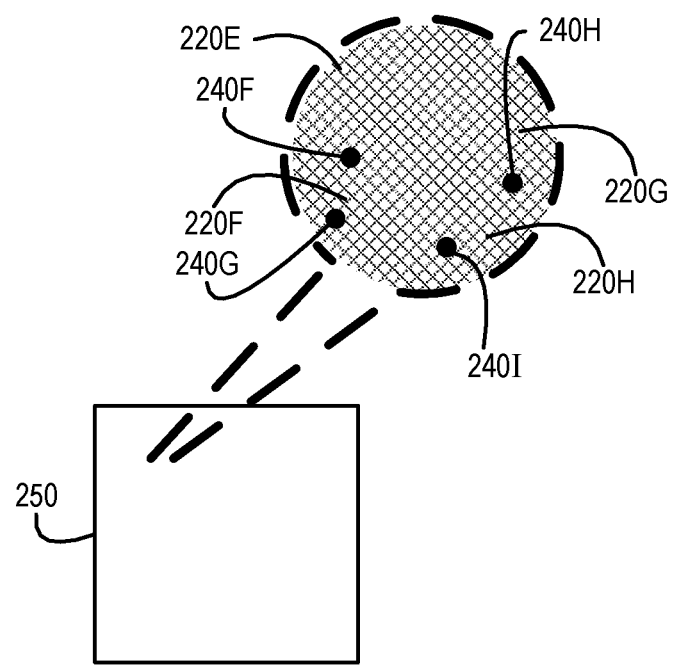

As shown in FIGS. 2K and 2M, outer layer 250 may be or include a woven material. In one example, the woven material may be or include a crimped material. In another example, the woven material may be or include a twill material. In one or more embodiments, the woven material may include carbon fibers 220E-220H, as illustrated in FIGS. 2K and 2M.

As illustrated in FIG. 2K, outer layer 250 may include polycarbonate fibers 230D and 230E. For example, the woven material may include polycarbonate fibers 230D and 230E. In one or more embodiments, a casting 215 may heat polycarbonate fibers 230. For example, a casting 215 may heat polycarbonate fibers 230 above a Tg of polycarbonate fibers 230. For instance, polycarbonate from polycarbonate fibers 230 may impregnate carbon fibers 220. In one or more embodiments, outer layer 250 may be or include a bidirectional material. For example, carbon fibers 220 and/or polycarbonate fibers 230 may be arranged in a bidirectional fashion, as illustrated in FIG. 2K.

As shown in FIG. 2M, outer layer 250 may include polycarbonate powder particles 240E-240I. For example, the woven material may include polycarbonate powder particles 240E-240I. In one or more embodiments, a casting 215 may heat polycarbonate powder particles 240. For example, a casting 215 may heat polycarbonate powder particles 240 above a Tg of polycarbonate powder particles 240. For instance, polycarbonate powder particles 240 may impregnate carbon fibers 220. In one or more embodiments, outer layer 250 may be or include a bidirectional material. For example, carbon fibers 220 may be arranged in a bidirectional fashion, as illustrated in FIG. 2M.

Figure 2N:
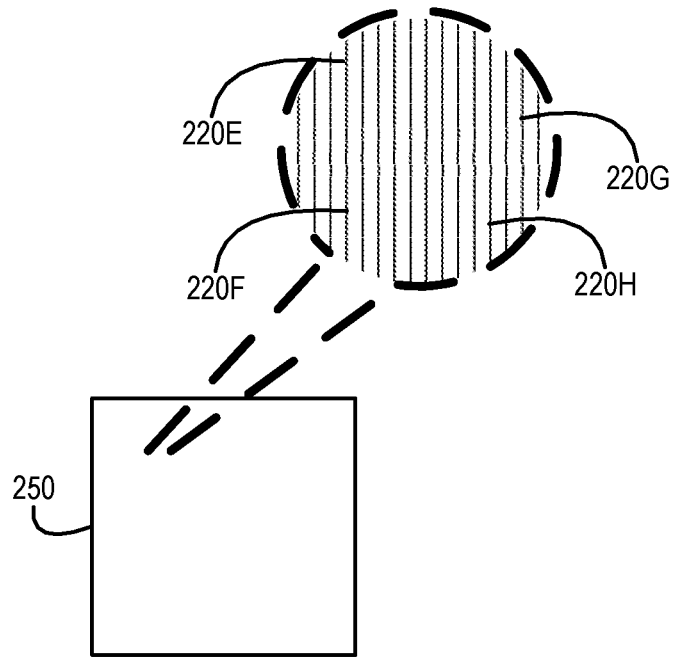
FIGS. 2N-2Q illustrate examples of an outer layer, according to one or more embodiments.
Figure 2O:
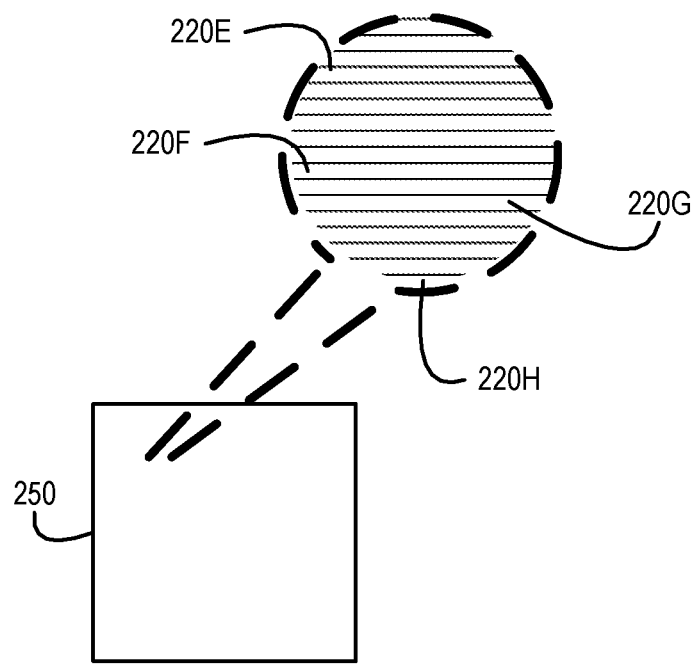
Figure 2P:
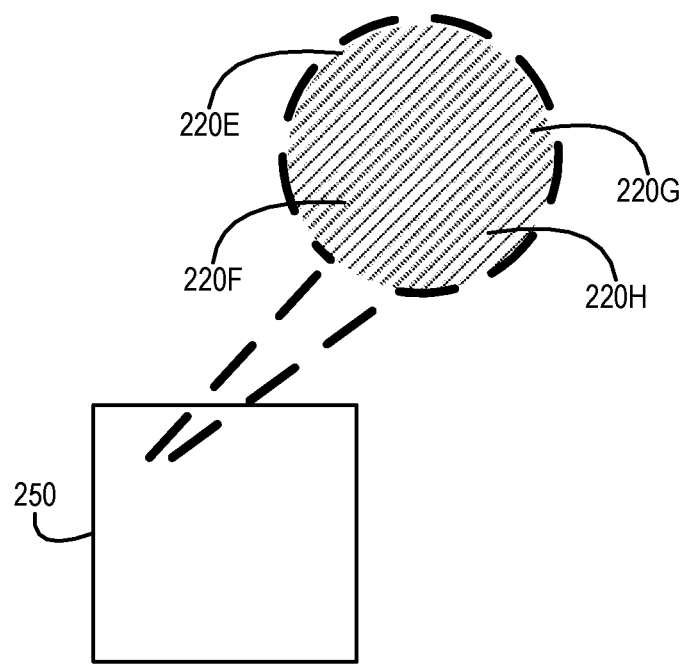
Figure 2Q:
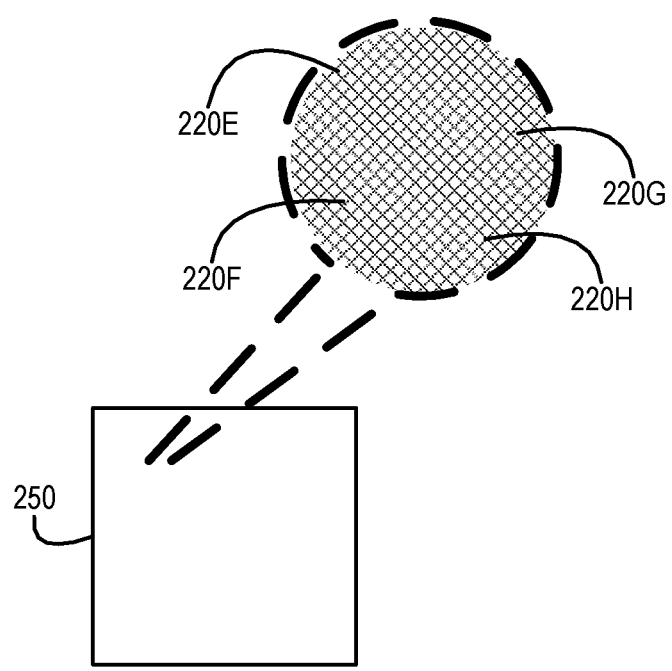

In one or more embodiments, outer layer 250 may not include polycarbonate fibers or may not include polycarbonate powder particles. For example, outer layer 250 may include carbon fibers 220 but may not include polycarbonate fibers 230 or polycarbonate powder particles 240, as illustrated in FIGS. 2N-2Q. In one or more embodiments, outer layer 250 may be or include a unidirectional material. For example, carbon fibers 220 may be arranged in a unidirectional fashion, as illustrated in FIGS. 2N-2P. In one or more embodiments, outer layer 250 may be or include a woven material. In one example, the woven material may be or include a crimped material. In another example, the woven material may be or include a twill material. In one or more embodiments, the woven material may include carbon fibers 220E-220H, as illustrated in FIG. 2Q.

In one or more embodiments, one or more polycarbonate sheets may be utilized in manufacturing a carbon fiber composite material. For example, if outer layer 250 does not include polycarbonate fibers or does not include polycarbonate powder particles, one or more polycarbonate sheets may be utilized in manufacturing carbon fiber composite material 230.

Figure 2R:
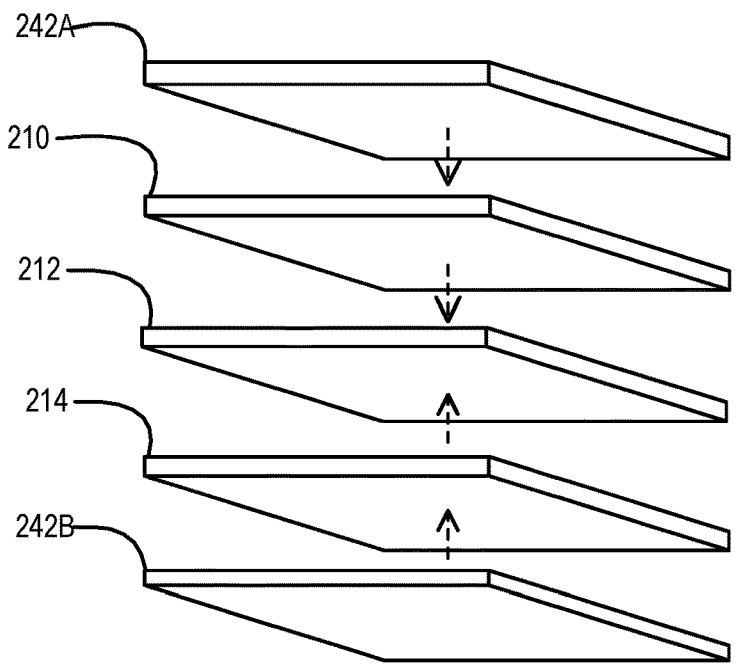
FIGS. 2R and 2S illustrate another example of manufacturing a carbon fiber composite material, according to one or more embodiments.
Figure 2S:
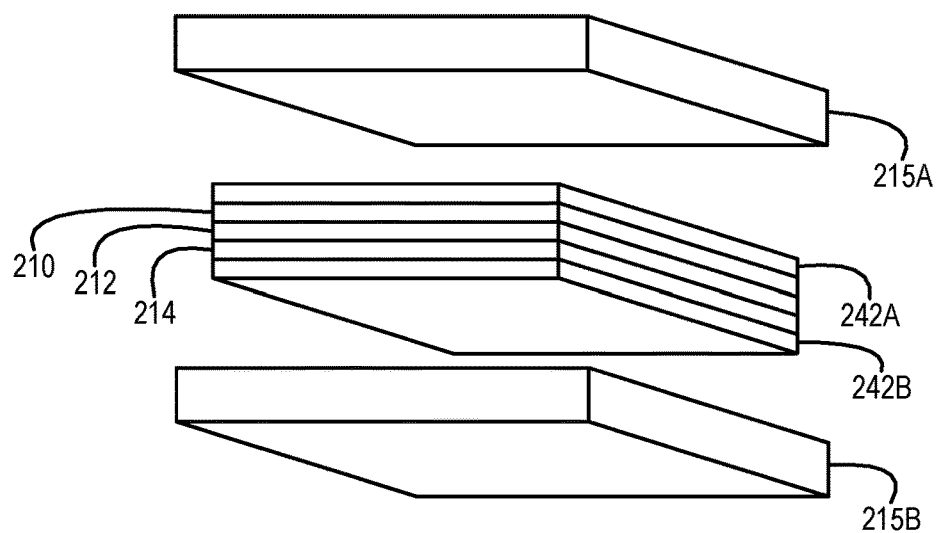

Turning now to FIGS. 2R and 2S, another example of manufacturing a carbon fiber composite material is illustrated, according to one or more embodiments. As shown in FIG. 2R, a first polycarbonate sheet 242A may be brought into contact with outer layer 210. For example, first polycarbonate sheet 242A may be placed on first outer layer 210.

As illustrated, first outer layer 210 may be brought into contact with core layer 212. For example, first outer layer 210 may be placed on core layer 212. As illustrated, second outer layer 214 may be brought into contact with core layer 214. For example, second outer layer 214 may be placed on core layer 214. As shown, a second polycarbonate sheet 242B may be brought into contact with outer layer 214. For example, second polycarbonate sheet 242B may be placed on second outer layer 214.

In one or more embodiments, first polycarbonate sheet 242A, first outer layer 210, core layer 212, second outer layer 214, and second polycarbonate sheet 242B may be placed in a mold. For example, the mold may include castings 215A and 215B. For instance, first polycarbonate sheet 242A, first outer layer 210, core layer 212, second outer layer 214, and second polycarbonate sheet 242B may be compressed between castings 215A and 215B. In one or more embodiments, castings 215A and 215B may be heated. For example, castings 215A and 215B may be heated to one or more temperatures. For instance, castings 215A and 215B may be heated to one or more temperatures for one or more periods of time. In one or more embodiments, castings 215A and 215B may apply heat and pressure to first polycarbonate sheet 242A, first outer layer 210, core layer 212, second outer layer 214, and second polycarbonate sheet 242B. In one or more embodiments, carbon fiber composite material 230, illustrated in FIG. 2C, may be manufactured from first polycarbonate sheet 242A, first outer layer 210, core layer 212, second outer layer 214, and second polycarbonate sheet 242B. In one example, first polycarbonate sheet 242A may impregnate carbon fibers 220 of first outer layer 210 with polycarbonate. In another example, second polycarbonate sheet 242B may impregnate carbon fibers 220 of second outer layer 214 with polycarbonate.

Figure 2T:
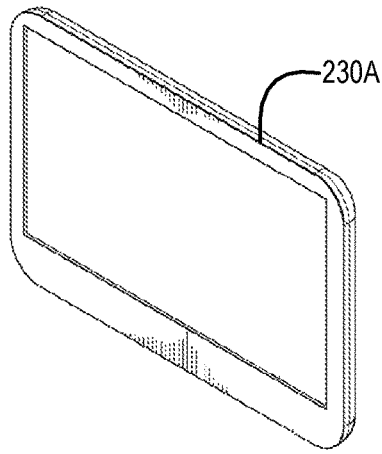
FIGS. 2T-2V illustrate examples of carbon fiber composite materials, according to one or more embodiments.
Figure 2U:
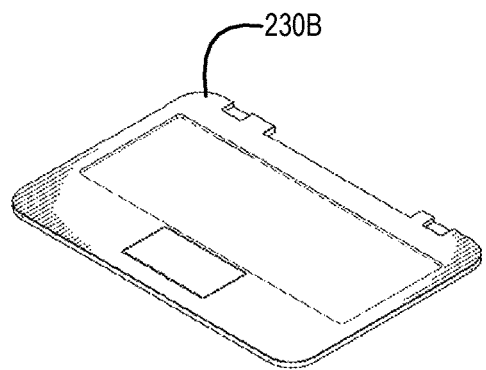
Figure 2V:
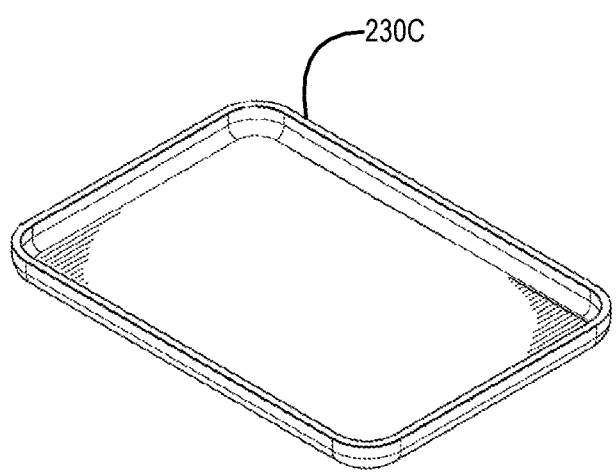

In one or more embodiments, castings 215A and 215B may be utilized to form a carbon fiber composite material 230. In one example, castings 215A and 215B may be utilized to form a carbon fiber composite material 230A, illustrated in FIG. 2T. In one instance, carbon fiber composite material 230A may be utilized as a portion of a tablet information handling system. In another instance, carbon fiber composite material 230A may be utilized as a display or lid of a laptop information handling system. In a second example, castings 215A and 215B may be utilized to form a carbon fiber composite material 230B, illustrated in FIG. 2U. For instance, carbon fiber composite material 230B may be utilized as a keyboard and/or a track pad portion of a laptop information handling system. In another example, castings 215A and 215B may be utilized to form a carbon fiber composite material 230C, illustrated in FIG. 2V. For instance, carbon fiber composite material 230C may be utilized as bottom portion of a laptop information handling system. In one or more embodiments, one or more of carbon fiber composite materials 230A-230C may be utilized as at least one or more portions of a chassis of an information handling system.

In one or more embodiments, a thermoplastic carbon fiber laminate may be referred to as a nonwoven thermoplastic carbon fiber laminate 230, which may include comprising three layers: outer layer 210, core layer 212, and outer layer 214. In one or more embodiments, fewer layers or more layers may be included in a non-woven thermoplastic carbon fiber laminate.

In one or more embodiments, in a construction of thermoplastic laminates utilized for information handling systems, a low weight and, thus, a low material density may be desirable. It is often the choice of the core layer that is utilized to reduce overall density, such as by using a resin core or a honeycomb core. In one or more embodiments, even when stiff fibers are utilized to reinforce the outer layers, such as carbon fiber weave, core layers constructed of resin or honeycomb may result in reduced overall flexural stiffness, which may be undesirable. Furthermore, the use of a so-called "directional carbon fiber", which refers to carbon fiber in the form of a weave or a unidirectional carbon fiber layer, may add cost to the overall laminate, which may also be undesirable.

In one or more embodiments, a core layer 212 may include non-woven carbon fiber having fiber lengths of greater than about one inch may be utilized as fiber reinforcement having isotropic stiffening properties. In one or more embodiments, a size or length of the carbon fibers may vary, such as between 0.1 inch and 2 inches in length, from about 0.5 inches to 1.5 inches in length, or greater than about 0.5 inches in length. In one or more embodiments, the nonwoven carbon fiber used may be virgin (i.e., new) or recycled carbon fiber material. In one or more embodiments, the random, anisotropic orientation of the carbon fibers, non-woven thermoplastic carbon fiber laminate 230 achieves a very high stiffness at a relatively low cost, which may be desirable for construction of mechanical components for portable information handling systems.

In one or more embodiments, outer layers 210 and 214 may include a directional carbon fiber reinforced thermoplastic material. In one example, directional carbon fiber may be or include a weave. In another example, directional carbon fiber may be or include a unidirectional (e.g., parallel) fiber layer.

In one or more embodiments, an orientation of outer layer 210 may be the same as an orientation of outer layer 214. For example, carbon fibers 220 of outer layer 210 and carbon fibers 220 of outer layer 214 may share the orientation as shown in FIG. 2N. In one or more embodiments, an orientation of outer layer 210 may be different from an orientation of outer layer 214. In one example, carbon fibers 220 of outer layer 210 may oriented as illustrated in FIG. 2N while carbon fibers 220 of outer layer 214 may oriented as illustrated in FIG. 2O. In another example, carbon fibers 220 of outer layer 210 may oriented as illustrated in FIG. 2O while carbon fibers 220 of outer layer 214 may oriented as illustrated in FIG. 2P.

Figure 2W:
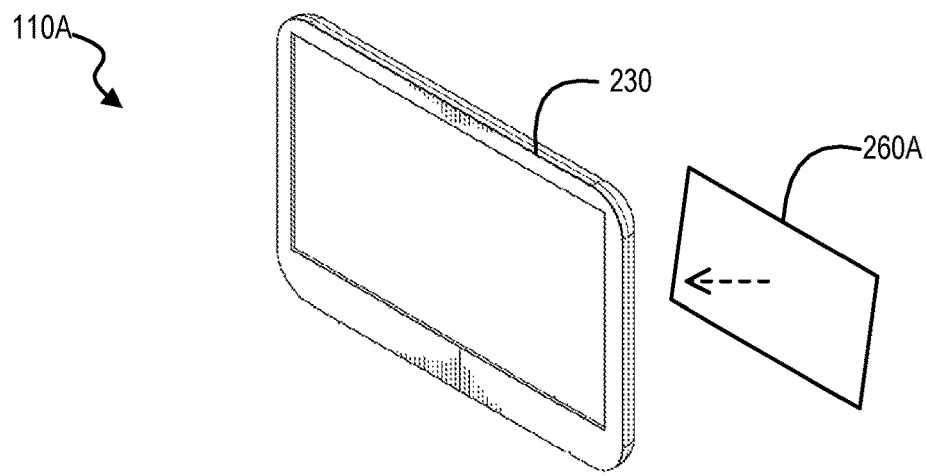
FIGS. 2W and 2X illustrate examples of information handling systems, according to one or more embodiments.
Figure 2X:
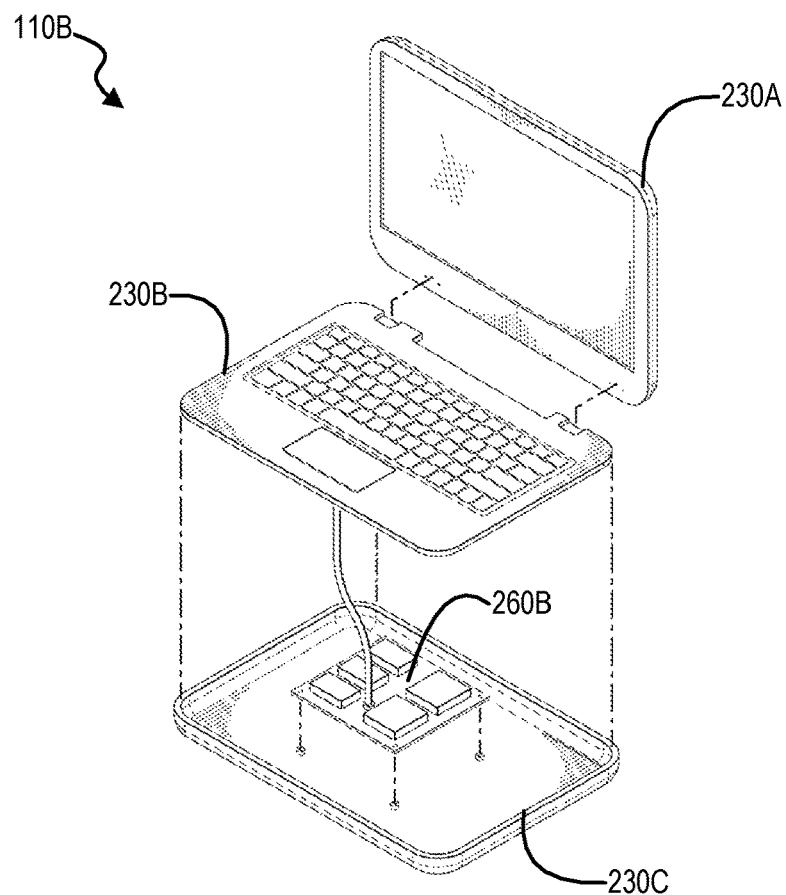

Turning now to FIGS. 2W and 2X, examples of information handling systems are illustrated, according to one or more embodiments. As shown in FIG. 2W, an IHS 110A may include a carbon fiber composite material 230 and a logic board 260A. For example, carbon fiber composite material 230 may be or include at least a portions of a chassis of IHS 110A. In one or more embodiments, one or more components of an information handling system may be mounted to a logic board 260A. For example, one or more of components 120-160, 170, 175, and 180 may be mounted to a logic board 260A. For instance, a logic board 260 may be or include a motherboard. In one or more embodiments, IHS 110A may be or include a portable computing device. For example, IHS 110A may be or include one or more of a PDA, a mobile device, a telephony device, a smart phone, a tablet computing device, a consumer electronic device, an electronic music player, an electronic camera, an electronic video player, a wireless access point, a network storage device, and a non-volatile memory medium, among others.

As shown in FIG. 2X, an IHS 110B may include carbon fiber composite materials 230A-230C and a logic board 260B. For example, carbon fiber composite materials 230A-230C may be or include at least one or more portions of a chassis of IHS 110B. In one or more embodiments, one or more components of an information handling system may be mounted to a logic board 260B. For example, one or more of components 120-160, 170, 175, and 180 may be mounted to a logic board 260B. For instance, a logic board 260B may be or include a motherboard. In one or more embodiments, IHS 110B may be or include a portable computing device. For example, IHS 110B may be or include one or more of a mobile device, a laptop computer device, a consumer electronic device, an electronic music player, and an electronic video player, among others.

Figure 3:
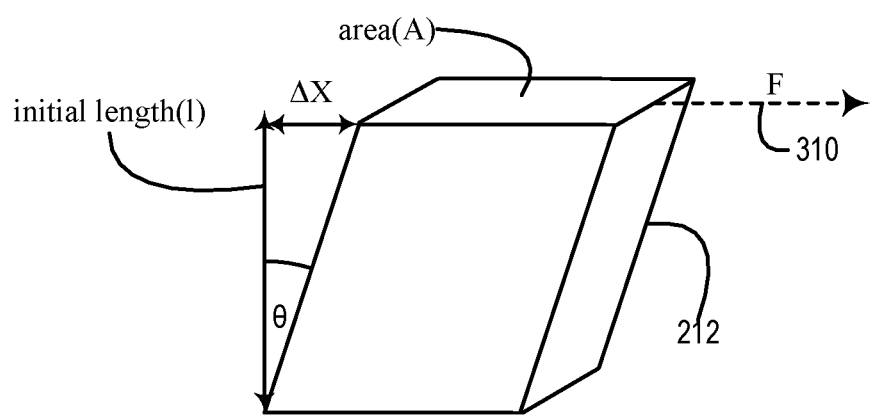
FIG. 3 illustrates an example of a shear strain of a core, according to one or more embodiments.

Turning now to FIG. 3, an example of a shear strain of a core is illustrated, according to one or more embodiments. As shown, a force may be applied to core layer 212 in a direction of dotted arrow 310. In one or more embodiments, core layer 212 may deform from the force applied. In one or more embodiments, a shear modulus may be defined as a ratio of shear stress to a shear strain. A shear modulus may be referred to as a modulus of rigidity, according to one or more embodiments.

In one or more embodiments, the shear modulus may be referred to as G, which may be defined as $$G \stackrel{def}{=} \frac{\tau_{xy}}{\gamma_{xy}} = \frac{F/A}{\Delta x/l} = \frac{F \cdot l}{A \cdot \Delta x},$$

where $\tau_{xy}$=F/A=shear stress; F may be a force which acts; A may be an area on which the force may act; $\gamma_{xy}$=shear strain=$\Delta x/l$=tan($\theta$); $\Delta x$ may be a transverse displacement; and l may be an initial length. In one or more embodiments, a shear modulus of core layer 212 may be at least 1.54 megapounds per square inch (msi). In one or more embodiments, a shear modulus of core layer 212 may be no more than 1.54 msi. In one or more embodiments, a shear modulus of core layer 212 may be or may be about 1.54 msi. In one or more embodiments, a shear modulus of core layer 212 may be in a range of 0.9868 msi to 2.2730 msi. In one example, the shear modulus of core layer 212 may be greater than or equal to 2.2730 msi. In another example, the shear modulus of core layer 212 may be less than or equal to 0.9868 msi.

In one or more embodiments, a shear strain of core layer 212 may be or may be about 37318.5 µε. In one or more embodiments, a shear strain of core layer 212 may be in a range of 22048.0 µε to 55650.5 µε. In one example, the shear strain of core layer 212 may be greater than or equal to 22048.0 µε. In another example, the shear strain of core layer 212 may be less than or equal to 55650.5 µε. In one or more embodiments, a shear stress of core layer 212 may be about 22559.2 pounds per square inch (psi). In one or more embodiments, a shear stress of core layer 212 may be in a range of 18712.5 psi to 26214.9 psi. In one example, the shear stress of core layer 212 may be greater than or equal to 18712.5 psi. In another example, the shear stress of core layer 212 may be less than or equal to 26214.9 psi.

Figure 4:
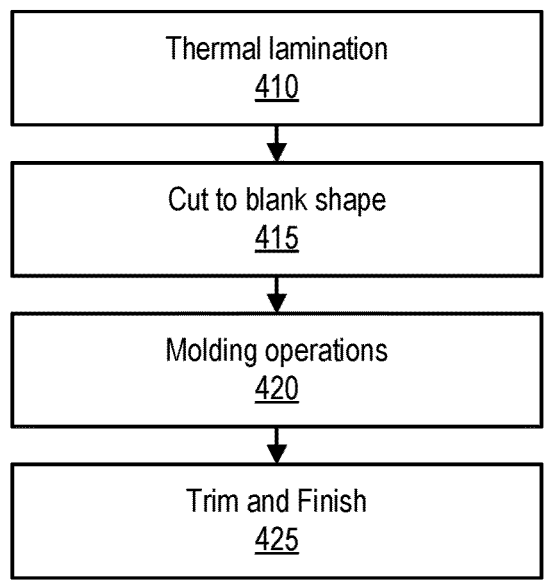
FIG. 4 illustrates an example of a method, according to one or more embodiments.

Turning now to FIG. 4, an example of a method is illustrated, according to one or more embodiments. At step 410 thermal lamination may be performed on multiple layers used to manufacture a part. For example, outer layer 210, core layer 212, and outer layer 214 may be thermally bonded together. In one or more embodiments, method element 410 may be performed using a rolling mill to manufacture a roll of thermoplastic carbon fiber laminate with a randomly oriented fiber reinforced core layer from individual rolls of the constituent materials. In one or more embodiments, method element 410 may be performed using individual discrete sheets to manufacture a sheet of non-woven thermoplastic carbon fiber laminate. In one or more embodiments, the thermal lamination of method element 410 may apply suitable temperatures and pressures, according to the particular material compositions used, such as for the thermoplastic matrix used in each individual layer. In one or more embodiments, method element 410 may produce carbon fiber composite material 230.

At 415, a blank may be cut to shape from the thermally laminated material. For example, a blank may be cut to shape from the thermally laminated material produced via method element 410. For instance, a blank may be cut to shape from carbon fiber composite material 230. In one or more embodiments, the blank may be stamped or machined to shape. For example, the blank may be stamped or machined to shape, depending on the intricacy or specific features on a particular part being manufactured.

At 420 and 425, the blank manufactured at 415 may be subject to molding operations and trim and finish, respectively. It is noted that the exact method elements included in method elements 420 and 425 may vary depending on the type of mold operation used, according to one or more embodiments. In a first example, at 420, a first thermoforming molding operation may be performed to initially shape the blank. In the first example, after trimming at 420, a second insert molding operation may be performed to add a secondary polymer layer to the blank. The secondary polymer layer may include an aesthetic or design element, such as for an external surface of the final part that is exposed to human handling by end users, according to one or more embodiments. Then in the second example, at 425, the final surface treatment of the finished part may be performs, such as painting or application of surface films, according to one or more embodiments. In a second example, at 420, a hybrid molding operation may be performed in which the blank is shaped using thermoforming molding, and then the secondary polymer layer is injection molded into the same mold. In the second example, at 425, the hybrid molded part may be trimmed and surface finished, as described in the first example. In a third example, at 420 and 425, hybrid molding may be performed to create the final part, including the application of any surface finishing within the mold.

Figure 5:
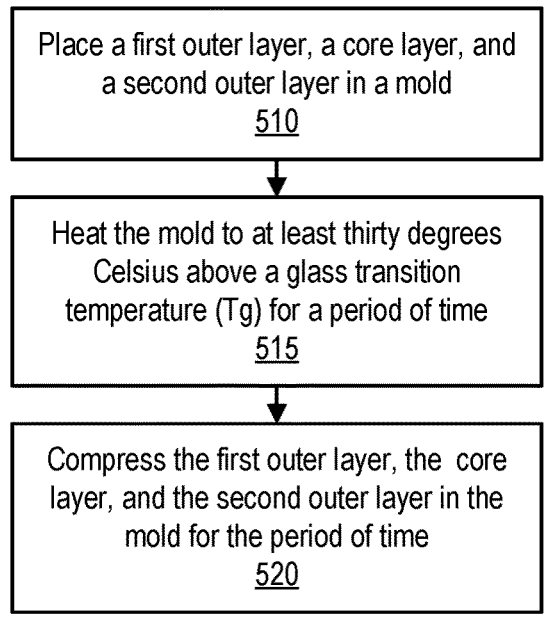
FIG. 5 illustrates another example of a method, according to one or more embodiments.

Turning now to FIG. 5, another example of a method is illustrated, according to one or more embodiments. At 510, a first outer layer, a core layer, and a second outer layer in a mold. For example, outer layer 210, core layer 212, and outer layer 214 may be placed in a mold. In one or more embodiments, the mold may include castings. For instance, placing outer layer 210, core layer 212, and outer layer 214 in the mold may include placing outer layer 210, core layer 212, and outer layer 214 between castings 215A and 215B.

At 515, the mold may be heated to at least thirty degrees Celsius above a glass transition temperature (Tg) for a period of time. For example, the period of time may be about thirty (30) seconds. In one or more embodiments, heating the mold to at least thirty degrees Celsius above the Tg for the period of time may include heating castings 215A and 215B to at least thirty degrees Celsius above the Tg for the period of time. In one or more embodiments, heating the mold to at least thirty degrees Celsius above the Tg for the period of time may permit thermal plastic to impregnate fibers of one or more of outer layer 210, core layer 212, and outer layer 214. For example, the fibers of one or more of outer layer 210, core layer 212, and outer layer 214 may be or include carbon fibers.

In one or more embodiments, core layer 212 may be associated with a Tg of or about one hundred and five degrees Celsius (105° C.). In one example, polycarbonate fibers 230 may have or may be associated with a Tg of or about 105° C. In another example, polycarbonate particles 240 may have or may be associated with a Tg of or about 105° C. In one or more embodiments, about 105° C. may be or include a range of temperatures of 105° C.±1° C. In one or more embodiments, about 105° C. may be or include a range of temperatures of 105° C.±2° C. In one or more embodiments, Tg may be less than or equal to 110° C.

At 520, the first outer layer, the core layer, and the second outer layer may be compressed in the mold for the period of time. For example, outer layer 210, core layer 212, and outer layer 214 may be compress in the mold. In one or more embodiments, the mold may include castings. For instance, compressing outer layer 210, core layer 212, and outer layer 214 in the mold may include compressing outer layer 210, core layer 212, and outer layer 214 between castings 215A and 215B. In one or more embodiments, the first outer layer, the core layer, and the second outer layer may be compressed in the mold for another period of time, different from the period of time. In one or more embodiments, the first outer layer, the core layer, and the second outer layer may be compressed in the mold for at least the period of time.

In one or more embodiments, an information handling system may control the mold. For example, the information handling system may implement at least a portion of the method illustrated in FIG. 5. In one or more embodiments, the method illustrated in FIG. 5 may be utilized to produce and/or manufacture a carbon fiber composite material. For example, the method illustrated in FIG. 5 may be utilized to produce and/or manufacture carbon fiber composite material 230. For instance, carbon fiber composite material 230 may be produced and/or manufactured by a process that includes one or more portions of the method illustrated in FIG. 5.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of manufacturing a carbon fiber composite material, comprising:
   placing a first outer layer, a core layer, and a second outer layer in a mold, wherein the core layer includes a nonwoven material that includes carbon fibers and polycarbonate fibers; and heating the mold to at least thirty degrees Celsius above a glass transition temperature (Tg) of the polycarbonate fibers for a period of time;

wherein the first outer layer includes a first thermoplastic matrix reinforced with first directional carbon fibers;

wherein the carbon fibers of the core layer are 30% to 40% by weight of the nonwoven material; and wherein the second outer layer includes a second thermoplastic matrix reinforced with second directional carbon fibers.

2. The method of claim 1, wherein the polycarbonate fibers are between eight and ten deniers per filament.

3. The method of claim 1, wherein the Tg is no more than 105 degrees Celsius.

4. The method of claim 1,
wherein a mechanical panel of the carbon fiber composite material has a total thickness P; and
wherein the mechanical panel has a stiffness corresponding to a deflection of the mechanical panel of less than 1% of a maximum span of the mechanical panel under a load of 100N force at a center of the mechanical panel.

5. The method of claim 1, wherein the first outer layer is a carbon fiber fabric.

6. The method of claim 5, wherein the carbon fiber fabric includes a twill pattern.

7. The method of claim 1, further comprising:
after the period of time, allowing the first outer layer, the core layer, and the second outer layer to cool below the Tg;
wherein after the allowing the first outer layer, the core layer, and the second outer layer to cool below the Tg, a shear modulus of the core layer is in a range of 0.9868 megapounds per square inch (msi) to 2.2730 msi.

8. A carbon fiber composite material by a process, comprising:
placing a first outer layer, a core layer, and a second outer layer in a mold, wherein the core layer includes a nonwoven material that includes carbon fibers and polycarbonate fibers; and
heating the mold to at least thirty degrees Celsius above a glass transition temperature (Tg) of the polycarbonate fibers for a period of time;
wherein the first outer layer includes a first thermoplastic matrix reinforced with first directional carbon fibers;
wherein the carbon fibers of the core layer are 30% to 40% by weight of the nonwoven material; and
wherein the second outer layer includes a second thermoplastic matrix reinforced with second directional carbon fibers.

9. The carbon fiber composite material of claim 8, wherein the polycarbonate fibers are between eight and ten deniers per filament.

10. The carbon fiber composite material of claim 8, wherein the Tg is no more than 105 degrees Celsius.

11. The carbon fiber composite material of claim 8,
wherein a mechanical panel of the carbon fiber composite material has a total thickness P; and
wherein the mechanical panel has a stiffness corresponding to a deflection of the mechanical panel of less than 1% of a maximum span of the mechanical panel under a load of 100N force at a center of the mechanical panel.

12. The carbon fiber composite material of claim 8, wherein the first outer layer is a carbon fiber fabric.

13. The carbon fiber composite material of claim 12, wherein the carbon fiber fabric includes a twill pattern.

14. The carbon fiber composite material of claim 8,
wherein the process further comprises:
after the period of time, allowing the first outer layer, the core layer, and the second outer layer to cool below the Tg; and
wherein after the allowing the first outer layer, the core layer, and the second outer layer to cool below the Tg, a shear modulus of the core layer is in a range of 0.9868 megapounds per square inch (msi) to 2.2730 msi.

* * * * *